US012789147B2

(12) United States Patent
(10) Patent No.: US 12,789,147 B2
(45) Date of Patent: Nov. 10, 2026

Yang et al.

(54) PROCESS FOR REMOVING CARBON DIOXIDE FROM ACETYLENE USING CHA-TYPE ZEOLITE MEMBRANE

(71) Applicant: Cleveland State University, Cleveland, OH (US)

(72) Inventors: Shaowei Yang, Westlake, OH (US); Ninad D. Anjikar, Cleveland, OH (US)

(73) Assignee: Cleveland State University, Cleveland, OH (US)

( * ) Notice: Subject to any disclaimer, the term of this patent is extended or adjusted under 35 U.S.C. 154(b) by 419 days.

(21) Appl. No.: 18/389,323

(22) Filed: Nov. 14, 2023

(65) Prior Publication Data

US 2024/0157310 A1 May 16, 2024

Related U.S. Application Data

(60) Provisional application No. 63/425,084, filed on Nov. 14, 2022.

(51) Int. Cl.

*B01D 71/02* (2006.01)
*B01D 69/08* (2006.01)

(52) U.S. Cl.

CPC ......... *B01D 71/0281* (2022.08); *B01D 69/08* (2013.01); *B01D 2321/42* (2022.08); *B01D 2323/00* (2013.01); *B01D 2325/04* (2013.01)

(58) Field of Classification Search

CPC ............ B01D 2325/04; B01D 2323/00; B01D 2321/42; B01D 69/08; B01D 71/0281

USPC ..................................................... 210/500.21

See application file for complete search history.

(56) References Cited

PUBLICATIONS

Zhu., S., Lin, Q., Huang, X., Chen, L., Liu, L., Yao, Z., and Xiang, S., Efficient Separation of Acetylene-Containing Mixtures Using ZIF-8 Membranes, 2021, ACS Omega, 6(48), 33018-33023 (Year: 2021).*

Liang, L., Zhu, M., Chen, L., et al. Single Gas Permeance Performance of High Silica SSZ-13 Zeolite Membranes, 2018, Membrane 8, 43. (Year: 2018).*

Nobandegani, M.S., Yu, L., and Hedlund, J., Zeolite membrane process for industrial CO2/CH4 separation, 2022, Chemical Engineering Journal, 446, Part 4, 137223 (Year: 2022).*

Liu, S., Han, X., Chai, Y., et al., Efficient Separation of Acetylene and Carbon Dioxide in a Decorated Zeolite, 2021, Angewandte Chemie International Edition, 60(6526), 6526-6532. (Year: 2021).*

Wang, J., Zhang, Y., Su, Y. et al., Fine pore engineering in a series of isoreticular metal-organic frameworks for efficient C2H2/CO2 separation, 2022, Nature Communications, 13(200). (Year: 2022).*

Fine pore engineering in a series of isoreticular metal-organic frameworks for efficient C2H2/CO2 separation (Year: 2022).*

* cited by examiner

*Primary Examiner* — Youngsul Jeong
*Assistant Examiner* — Wilson Gallardo Mendoza
(74) *Attorney, Agent, or Firm* — Lippes Mathias LLP

(57) ABSTRACT

A process for separating carbon dioxide from acetylene utilizes a CHA-type zeolite membrane.

20 Claims, 2 Drawing Sheets

PROCESS FOR REMOVING CARBON DIOXIDE FROM ACETYLENE USING CHA-TYPE ZEOLITE MEMBRANE

This application claims the benefit of U.S. Provisional Application No. 63/425,084 filed Nov. 14, 2022 and titled "PROCESS FOR REMOVING CARBON DIOXIDE FROM ACETYLENE USING CHA-TYPE ZEOLITE MEMBRANE", which is incorporated by reference in its entirety.

BACKGROUND

Acetylene ($C_2H_2$) is an important industrial fuel and feedstock chemical. One major $C_2H_2$ production route is the partial oxidation of natural gas. $CO_2$ is generated during the reaction. $CO_2/C_2H_2$ separation is one of the critical separation steps needed to obtain $C_2H_2$ with desired purity. The separation is challenging because of their almost identical kinetic diameters (ca. 3.3 Å), very close molecular dimensions ($CO_2$: 3.2×3.3×5.4 Å and $C_2H_2$: 3.3×3.3×5.7 Å), and similar physical properties (boiling points: $C_2H_2$, 189.3 K; $CO_2$, 194.7 K). Currently, $CO_2/C_2H_2$ separation is performed by organic solvent extraction and regeneration, which is energy-intensive and has environmental impacts. A more energy-efficient and environment-friendly separation technology is highly desirable. Adsorption-based processes have been researched extensively. A range of metal-organic frameworks, porous coordination polymers (PCPs), and organic—inorganic ionic crystals have been tailored/designed and show Ideal Adsorbed Solution Theory (IAST) $C_2H_2/CO_2$ selectivity of up to 185 and $CO_2/C_2H_2$ selectivity up to over 105. There are very limited reports of $CO_2/C_2H_2$ separation with membranes. Zhu et al. reported a ZIF-8 membrane with $C_2H_2/CO_2$ separation factor of 1.8, (i.e. slightly $C_2H_2$ selective), at atmospheric feed pressure and room temperature. Another report is a simulation work. It demonstrated computationally that strain-controlled C2N or C2O two-dimensional (2D) membranes may achieve perfect $CO_2/C_2H_2$ selectivity when the strain between two adjacent nanosheets can be perfectly controlled.

However, a continuous, highly $CO_2$-selective, and steady-state membrane separation process would be the best energy-efficient choice.

BRIEF DESCRIPTION

Disclosed, in some embodiments, is a process for separating carbon dioxide from acetylene. The process includes feeding a feed composition containing carbon dioxide and acetylene to a first separator comprising a CHA-type zeolite membrane. The CHA-type zeolite membrane separates the feed composition into a carbon-dioxide rich stream and an acetylene rich stream.

The process may further include recovering an acetylene-rich product stream.

In some embodiments, the CHA-type zeolite membrane has a $CO_2/C_2H_2$ permselectivity of at least 10 (including at least 37, 37 to 88, or 40 to 70).

The process may further include treating the CHA-type zeolite membrane with ozone to regenerate the membrane.

In some embodiments, the CHA-type zeolite membrane is a high-silica CHA-type zeolite membrane.

The CHA-type zeolite membrane may include a porous substrate and a CHA-type zeolite coating.

In some embodiments, the CHA-type zeolite coating is formed by a process which includes coating at least a portion of the porous substrate with a precursor gel.

The precursor gel may contain water; silicon dioxide; sodium oxide; aluminum oxide; and trimethyladamantylammonium hydroxide.

In some embodiments, the feed composition contains partially oxidized natural gas.

The separation may be performed at a temperature in a range of from room temperature (e.g., 20° C.) to 150° C.

In some embodiments, the membrane or zeolite coating has a thickness of less than 1 μm or 500 nm to 10 μm.

The porous substrate may include an organic material.

In some embodiments, the porous substrate includes a polymeric material selected from polypropylene, polyethylene, polytetrafluoroethylene, polysulfone, polyimide, and polyamide-imide (PAI) hollow fiber supports.

The porous substrate may include an inorganic material.

In some embodiments, the inorganic material is selected from a ceramic sintered body or a sintered metal.

The porous substrate may have a porosity in a range of about 10% to about 60%.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
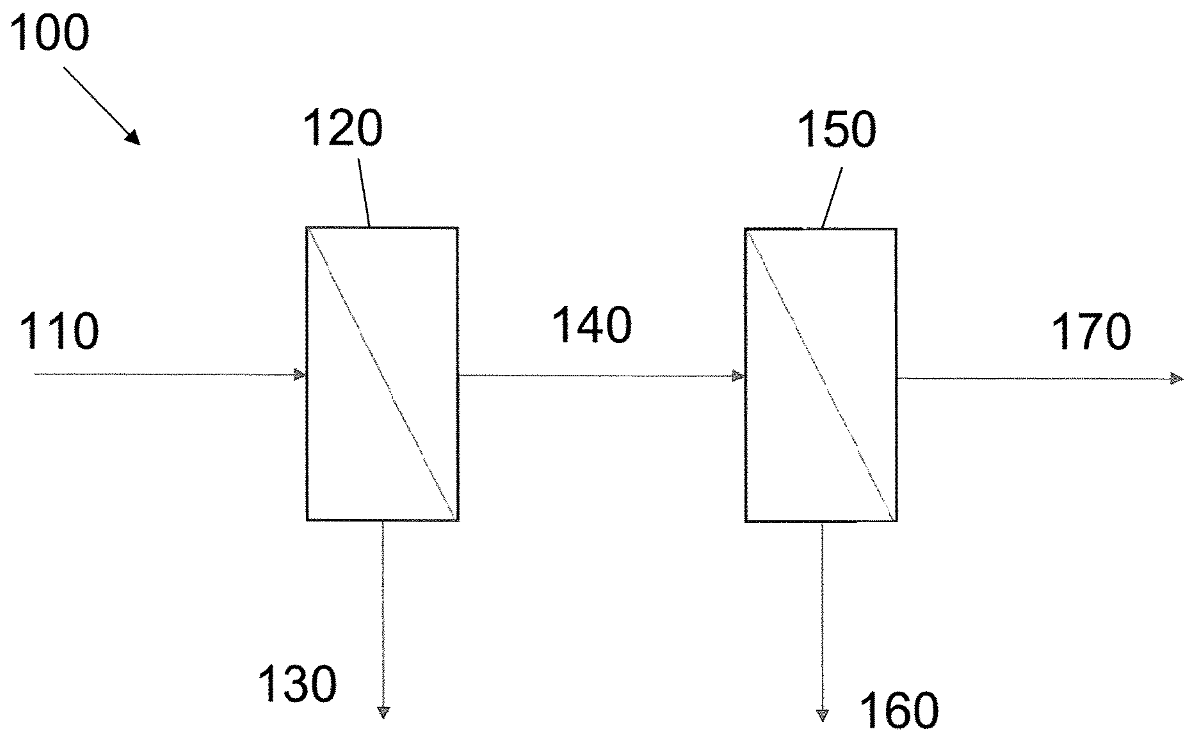
FIG. 1 is a schematic diagram illustrating a non-limiting embodiment of a process for separating $CO_2$ and $C_2H_2$ using a CHA-type zeolite membrane.

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to a process for removing carbon dioxide from acetylene using a chabazite (CHA) zeolite membrane.

FIG. 1 is a flow chart illustrating a non-limiting embodiment of a process 100 for separating $CO_2$ and $C_2H_2$ using a CHA-type zeolite membrane. The process includes feeding a composition (e.g., partially oxidized natural gas) 110 containing $CO_2$ and $C_2H_2$ to a separator 120 including a CHA-type zeolite membrane.

The feed composition 110, in addition to $CO_2$ and $C_2H_2$, may further contain at least one of $H_2$, CO, $O_2$, $CH_4$, $C_2H_4$, and other carbon-containing compounds (e.g., with 3 or more carbon atoms).

The CHA-type zeolite membrane 120 separates the feed composition into a $CO_2$-rich stream 130 and $C_2H_2$-rich stream 140. The $CO_2$-rich steam 130 may further contain at least one of $H_2$, CO, and $O_2$. The $C_2H_2$-rich stream may further contain one or more of $CH_4$, $C_2H_4$, and other carbon-containing compounds (e.g., with 3 or more carbon atoms).

A second separator 150 may be used to conduct a further separation and produce a purified $C_2H_2$ product stream 170 and a $C_2H_2$-depleted stream 160. The $C_2H_2$-depleted stream 160 may contain one or more of $CH_4$, $C_2H_4$, and other carbon-containing compounds (e.g., with 3 or more carbon atoms). FIG. 1 depicts two separators. However, the present disclosure is not limited to such configurations and one separator or multiple separators may be utilized. The separators may be connected in series or in parallel.

In some embodiments, the CHA zeolite membrane includes a porous substrate and a CHA zeolite coating.

The CHA zeolite membrane may be formed by a process including: providing at least one porous substrate; and applying the CHA zeolite coating to the at least one porous substrate.

Figure 2:
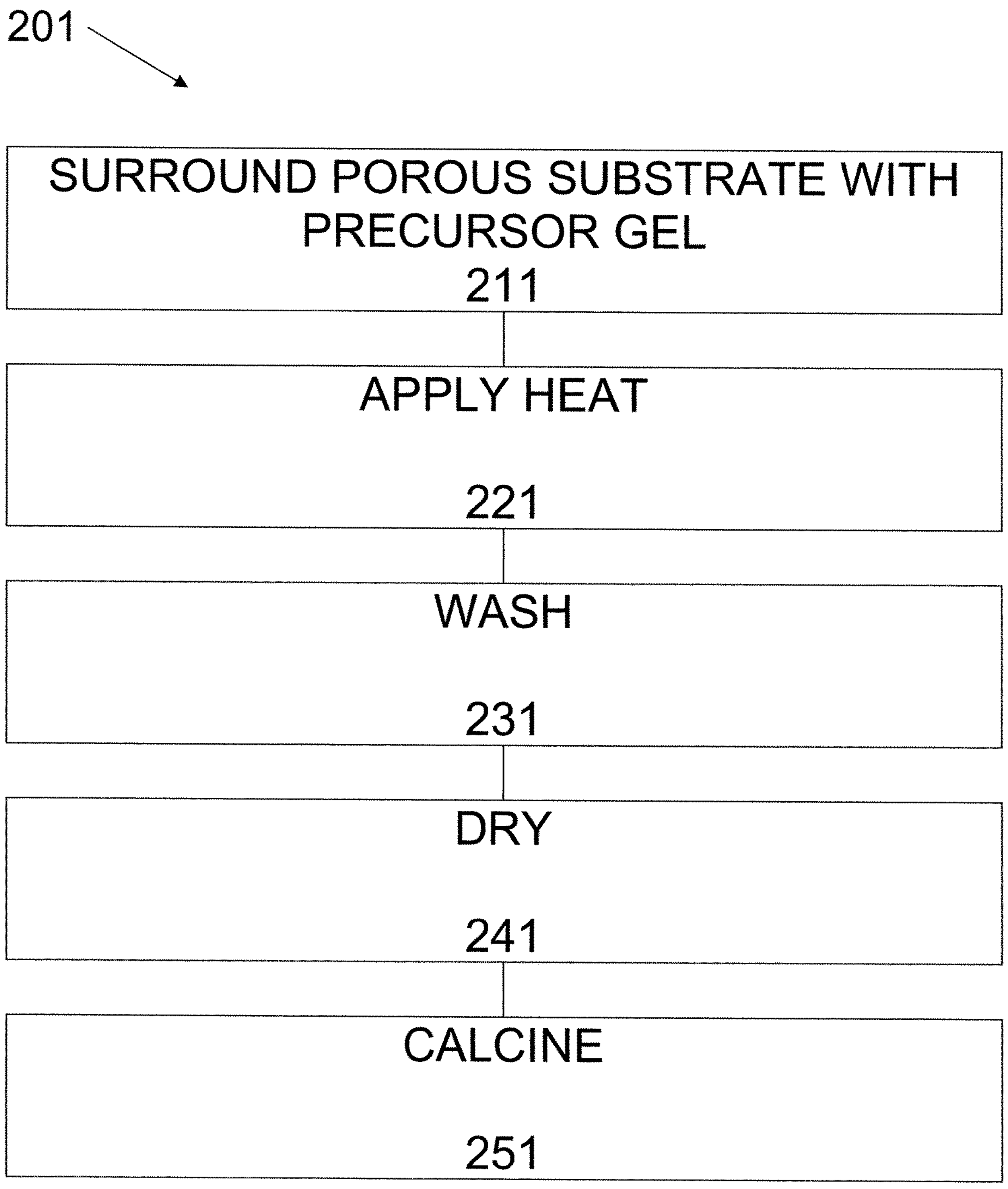
FIG. 2 is a flow chart illustrating a method for applying a CHA zeolite coating to a porous substrate in accordance with some embodiments of the present disclosure.

FIG. 2 illustrates a non-limiting example of a process for applying the CHA zeolite coating 201. The process 201 includes surrounding at least a portion of the at least one porous substrate with a precursor gel 211; heating the at least one porous substrate and the precursor gel 221; washing the at least one porous substrate 231; drying the at least one porous substrate 241; and calcining the at least one porous substrate 251.

In some embodiments, the heating can occur at a temperature of between about 400K and about 500K.

In some embodiments, the heating can occur for a time period of between about 6 hours and about 72 hours.

In some embodiments, the at least one porous substrate includes at least one porous hollow fiber.

In some embodiments, the membrane has a low thickness. For example, in some embodiments, the membrane has a thickness of less than 1000 nm, less than 900 nm, less than 800 nm, less than 700 nm, or less than 600 nm. The zeolite membrane thickness may be in a range of about 500 nm to about 10 μm.

The porous substrate can be organic or inorganic. Examples of organic substrate materials include polymers such as polypropylene, polyethylene, polytetrafluoroethylene, polysulfone, polyimide, polyamide-imide (PAI) hollow fiber supports, and the like. Examples of inorganic supports include a ceramic sintered body such as silica, alpha-alumina, gamma-alumina, aluminosilicate, mullite, zirconia, titania, yttria, silicon nitride, and silicon carbide, a sintered metal such as iron, bronze and stainless steel, glass, and a carbon molding.

In some embodiments, the porous substrate has an average pore diameter of from about 50 nanometers to about 1,000 nanometers, for example, from about 100 nanometers to about 200 nanometers, and a porosity, for example, of from about 10% to about 60%, such as from about 30% to about 50%. The porosity or degree of porosity is understood to be the ratio of the pore volume to the total volume of the support structure. Pore diameters smaller than 50 nanometers are less suitable due to the insufficient permeation flow rates. A porosity of less than 10% also produces a large reduction in the permeation flow rate. If the pore diameter is larger than 1,000 nanometers a decrease in selectivity may occur. A porosity of higher than 60% may also result in a decrease in selectivity and in the strength of the material.

In some embodiments, the porous support has a room-temperature propylene permeance and propane permeance of about >1,000 gas permeation units.

The porous substrate is not subject to particular shape/geometry requirements. One type of geometry for separation applications includes tubes or cylinders of a length of 10 to 100 cm and having an external diameter of at least 10 mm and a tube thickness of at least 0.2 mm to several millimeters. The porous, crystalline material can be formed on the internal and/or external surface of the tubular support structure, and preferably to the external surface. The porous structure can also be a cylindrical structure having an external diameter of 30 to 100 mm and a length of 20 to 100 cm and a large number of longitudinal channels with diameters of 2-12 mm. However, disks, plates, beads, honeycomb structures, and the like may be suitable in certain applications.

In some embodiments, an alpha-alumina substrate is produced. The alpha-alumina substrate may have a pore size of about 100 nanometers.

The CHA-type zeolite coating may be applied by subjecting the porous substrate to a dip coating process of a vacuum-assisted filtration process.

Some aspects of zeolite membranes and methods for forming the same are disclosed in U.S. Patent Application Publication Nos. 2021/0268448 A1 and 2022/0203307 A1, which are incorporated by reference herein in their entireties.

The precursor gel may be manufactured by a process including: combining sodium hydroxide, a trimethyladamantylammonium hydroxide (TMAdaOH) solution in water, and aluminum hydroxide while stirring to form a first mixture; adding CHA crystals to the first mixture; and evaporating at least a portion of the water in the first mixture (optionally in a silicone oil bath).

In any of the embodiments disclosed herein, the precursor gel can comprise silicon dioxide ($SiO_2$), sodium oxide ($Na_2O$), aluminum oxide ($Al_2O_3$), and trimethyladamantylammonium hydroxide (TMAdaOH) present in a molar composition of about 1.0 $SiO_2$:0.1 $Na_2O$:0.005 $Al_2O_3$:0.4 TMAdaOH.

Coating the at least one porous substrate with a precursor gel may include: surrounding at least a portion of the at least one porous substrate with the precursor gel; heating the at least one porous substrate and the precursor gel; washing the at least one porous substrate; drying the at least one porous substrate; and calcining the at least one porous substrate.

The precursor gel may contain a continuous gel phase and a plurality of CHA crystals.

The precursor gel can contain silicon dioxide ($SiO_2$) and water ($H_2O$). The ratio of $H_2O$ to $SiO_2$ can be from about 1:1 to about 50:1, including from about 1:1 to about 20:1, from about 1:1 to about 15:1, from about 5:1 to about 15:1, from about 5:1 to about 10:1, from about 1:1 to about 10:1, from about 1:1 to about 5:1, from about 5:1 to about 20:1, from about 10:1 to about 20:1, and from about 10:1 to about 15:1.

High $CO_2$ permeance and unexpectedly high $CO_2/C_2H_2$ selectivity are exhibited by high-silica (e.g., Si/Al ratio of greater than 50) CHA-type zeolite hollow fiber membranes. CHA-type zeolite may have a window-cage structure and the window opening (pore size) is 0.38 nm.

Without wishing to be bound by theory, it is believed that the $CO_2$ permselectivity is a result of different steric hindrances for permeation at the boundaries between zeolite crystal grains in the membrane. Besides molecular diffusion inside zeolite crystals, two other possible locations might impose different transport resistances: 1) membrane surface (zeolite/gas interface); and 2) intercrystalline boundaries. The zeolite surface might have a small extra transport resistance. But surface resistance alone is not expected to create such a drastic difference in selectivity between two closely sized molecules like $CO_2$ and $C_2H_2$. The surface effect would also be involved in dynamic adsorption uptake test, which did not show $CO_2$ diffusion selectivity. It is believed that the selectivity is likely from intercrystalline boundaries. Zeolite membranes are polycrystalline and intercrystalline boundaries are inevitable and abundant. They are commonly considered defects as the zeolite film will shrink after membrane activation. Conceptually intercrystalline boundaries can be categorized as two types: aligned with or perpendicular to gas permeation direction. Only those boundaries aligned with the gas permeation direction are expected to be enlarged after membrane activation and act as non-selective defects. In the present case, such grain boundaries appear to be absent as the membrane is highly selective. The boundaries perpendicular to the gas permeation direction do not have to be enlarged as crystals can expand/shrink freely in that direction. It is possible that the intercrystalline space might be small enough to impose drastically different steric resistance for $CO_2$ and $C_2H_2$ because of their different lengths ($CO_2$: 5.4 Å, $C_2H_2$: 5.7 Å). However, it is very challenging to directly observe this phenomenon experimentally.

The membrane of CHA zeolite coating may have a thickness in a range of about 1 μm to about 10 μm, including from about 2 μm to about μm, from about 2.4 μm to about 3.8 μm, or about 3.1 μm.

The CHA zeolite membrane may have a molar ratio of Si:Al of at least about 26, at least about 30, at least about 35, at least about 40, at least about 42, at least about 45, at least about 50, or at least about 58.

Pure silica CHA zeolite membranes are also contemplated.

The following examples are provided to illustrate the devices and methods of the present disclosure. The examples are merely illustrative and are not intended to limit the disclosure to the materials, conditions, or process parameters set forth therein.

EXAMPLES

Nine (9) hollow fiber membrane samples were tested for single gas permeation with a pressure differential method. First, $CO_2/C_3H_8$ unary (ideal) selectivity was determined to evaluate the membrane quality. As shown in Table 1 (below), all membranes demonstrated ideal $CO_2/C_3H_8$ permselectivities >100, confirming excellent membrane quality. The same membranes then demonstrated $CO_2/C_2H_2$ permselectivity ≥37. The membranes had $CO_2$ permeance of $1.1\pm0.38\times10^{-6}$ $mol\cdot m^{-2}\cdot Pa^{-1}\cdot s^{-1}$ and $CO_2/C_2H_2$ ideal selectivity of 55±15. The lowest $CO_2/C_2H_2$ selectivity was for membrane M4, which also had the highest defect density based on $CO_2/C_3H_8$ selectivity. This results in slightly more molecules permeating through non-selective defects, which impacts the overall selectivity. Both $CO_2$ and $C_2H_2$ permeance decreased when increasing permeation test temperature from 295 to 373 K. $CO_2$ had sharper decrease and caused lower $CO_2/C_2H_2$ ideal selectivity at higher temperatures.

Membranes M1 and M2 were investigated for $CO_2/C_2H_2$ binary mixture separation at room temperature (~295 K) with different feed compositions. The membrane consistently showed $CO_2/C_2H_2$ separation factor >30, which was lower than ideal selectivity of 58 from unary gas measurements. Based on the unary and binary $CO_2$ permeances in Table 1, this is explained as resulting from retardation of faster-permeating $CO_2$ by the slower $C_2H_2$ in the binary mixture case. The $CO_2$ permeance was thus reduced by about 50% from the unary value. A similar but more drastic permeance retardation was observed for $H_2$ in CHA-type zeolite membranes (down to only a few percent of its unary permeance) because of the presence of $C_3H_8$, or of other hydrocarbon molecules in the case of MFI zeolite membranes. This is likely a result of preferred adsorption of $C_2H_2$ inside the zeolite CHA cages instead of the windows (pore openings). A similar behavior is observed for $CH_4$ in DDR zeolite, which explained the lack of a large $CO_2$ permeance drop in $CO_2/CH_4$ mixture separation. The same trend was also confirmed with another membrane tested under the same conditions.

TABLE 1

Pure gas permeance and ideal permselectivities of hollow fiber CHA membranes M1-M9 at 295 K and 2 bar transmembrane pressure. Permeances are in units of $10^{-9}$ mol · m$^{-2}$ · Pa$^{-1}$ · s$^{-1}$.

| | $CO_2$ | $C_2H_2$ | $C_3H_8$ | $CO_2/C_2H_2$ selectivity | $CO_2/C_3H_8$ selectivity |
|---|---|---|---|---|---|
| M1 | 1400 | 25 | 11 | 57 | 120 |
| M2 | 990 | 17 | 4.7 | 58 | 210 |
| M3 | 1300 | 21 | 4.3 | 64 | 310 |
| M4 | 510 | 14 | 4.5 | 37 | 110 |
| M5 | 1200 | 13 | 1.4 | 88 | 840 |
| M6 | 920 | 16 | 0.8 | 56 | 1180 |
| M7 | 1700 | 34 | 5.5 | 49 | 310 |
| M8 | 430 | 11 | 1.6 | 38 | 270 |
| M9 | 1100 | 23 | 5.4 | 47 | 200 |
| Mean | 1100 ± 380 | 19 ± 6.7 | 4.4 ± 3.0 | 55 ± 15 | 400 ± 340 |

Longer-term permeation measurements were conducted over two weeks with the M2 membrane. The membrane permeance and selectivity slowly decreased over two weeks. The decrease may be expected as a result of self-reaction of $C_2H_2$ to form bulkier molecules, such as vinylacetylene and divinylacetylene, which can block the zeolitic channels. Moreover, the membrane separation performance could be recovered with a mild regeneration treatment, i.e., under flowing ozone/oxygen mixture at 423 K for 1 day.

Experimental Procedures

Materials and Characterization Method

For zeolite crystal and membrane preparation, 20 wt. % trimethyladamantylammonium hydroxide (TMAdaOH) aqueous solution was provided by SACHEM, Inc. Ludox SM-30 colloidal silica solution, aluminum hydroxide and sodium hydroxide were purchased from Sigma Aldrich. Aluminum oxide (Baikalox CR6, Baikowski), polyethersulfone (PES, VERADEL 3000P from Solvay Advanced Polymers) Polyvinylpyrrolidone (PVP K90 from Tokyo Chemical Industry Co.) and N-Methyl-2-pyrrolidone (NMP, 99%, VWR) were used for alumina hollow fiber preparation. Alumina disks with 2.5 cm diameter, 1 mm thickness and porosity of ~15% were purchased from Coorstek and used for disk membrane fabrication. For adsorption and permeation measurements, helium (ultrahigh purity), carbon dioxide (bone dry), acetylene (atomic absorption grade, dissolved in acetone) and propane (industrial grade) were purchased from Airgas USA LLC. and used directly. PANalytical X'Pert Pro diffractometer was used for X-ray diffraction (XRD) measurements using Cu Kα radiation. FEI Inspect F50 field emission scanning electron microscope (SEM) was used to characterize crystal and membrane morphology.

Preparation of α-$Al_2O_3$Hollow Fibers

The alumina hollow fibers were prepared by spinning followed by high-temperature sintering to consolidate the fibers the same as in Min et. al. (*Angew. Chem., Int. Ed.* 2019, 58, 8201-8205) which is incorporated by reference herein in its entirety. The spinning was conducted with an alumina suspended polymer solution. The dope solution had weight ratio of 38.0 NMP:6.8 PES:54.7 $Al_2O_3$:0.5 PVP. DI water was used as bore fluid while tap water was used as coagulant fluid. The flow rates for dope and bore fluids were of 120 and 80 mL/h, respectively. An air gap of 3 cm was used, and the fibers fell freely into the water bath. After soaking in DI water for 3 days and further exchange with methanol, the fibers were thoroughly dried and sintered at 1673 K for 6 h with a ramping rate of 5 K/min. One fiber end was glass-sealed by dipping into Duncan Pure Brilliance clear glaze suspension for 10 s. It was then dried in air for 10 min and sintered at 1223 K for 2 h with a ramping rate of 5 K/min.

CHA Zeolite Crystals and Membrane Preparation

The seed crystal and membrane preparation were similar to Yang et al. (*ChemNanoMat* 2019, 5, 61-67), which is incorporated by reference herein in its entirety, except that more concentrated gel was used for second time synthesis. In situ synthesis was first conducted with a precursor gel composed of 1.0 $SiO_2$: 0.10 $Na_2O$: 0.025 $Al_2O_3$: 0.40 TMAdaOH: 44$H_2O$. Hydrothermal synthesis was conducted at 433 K for 4 days. The resulting crystals were recovered and used as seeds for secondary growth to get smaller crystals. Secondary growth was conducted at 453 K for 24 h with more concentrated gel. The gel molar composition was 1.0 $SiO_2$: 0.10 $Na_2O$: 0.025 $Al_2O_3$: 0.40 TMAdaOH: 5$H_2O$. The membrane synthesis gel had a molar composition of 1.0 $SiO_2$: 0.10 $Na_2O$: 0.005 $Al_2O_3$: 0.40 TMAdaOH: 5$H_2O$. Seed crystals (2 wt. % of silica in the precursor gel) were thoroughly mixed with the precursor gel. Hydrothermal synthesis was conducted by placing the glass-sealed alumina hollow fibers in a Teflon holder with a ½" hole. It was then filled with the precursor gel and underwent hydrothermal treatment in an autoclave at 453 K for 16 h. After synthesis, the fibers were rinsed and soaked in DI water till pH close to neutral. Membrane activation was conducted at 823 K for 10 h with ramping rate of 0.5 K/min after drying. The residue crystals from membrane synthesis were collected for adsorption isotherm tests. To get more reliable dynamic adsorption uptake for diffusion analysis, larger crystals were desired. The larger crystal synthesis was attempted by in situ method at 433 K for 4 days with precursor gel composed of 1.0 $SiO_2$: 0.10 $Na_2O$: 0.005 $Al_2O_3$: 0.40 TMAdaOH: 44$H_2O$. The precursor gel composition was the same with membrane synthesis gel except that it was more dilute, and no seed crystals were added. The crystals were activated by calcination at 823 K for 10 h. Due to the thin zeolite film and the curvature of the hollow fibers, the XRD peaks for the hollow fiber membrane samples are relatively weak. A disk membrane was prepared for XRD characterization. The disk membrane was synthesized in the same precursor for the same duration with the membrane side facing up. No impurity peak was found, indicating good CHA zeolite phase purity.

Permeation Measurements

A homemade permeation cell described in Brown et al. (*Science* 2014, 345, 72-75), which is incorporated by reference herein in its entirety, was used for membrane permeation tests. The glass-sealed end of the fiber was first broken before the fiber was sealed in the cell with epoxy. The membrane area was about 0.8 cm$^2$. Degassing was conducted under vacuum or continuous He flow until there was no further $CO_2$ permeance increase. Single-gas permeation tests were conducted by the standard pressure-rise method at 2 bar feed pressure. Mixture permeation tests were conducted by Wicke-Kallenbach setup using a PerkinElmer Clarus 590 gas chromatography (GC). Both feed and permeate side was kept at atmospheric pressure (~1 bar). Feed and sweep flow rates of ~40 mL/min was used. The permeance and selectivity were calculated with following equations:

$$P_{m,i} = \frac{Q}{A_m \cdot t \cdot \Delta P_i} \quad \text{(Equation 1)}$$

$$\alpha^o_{i/j} = P^o_{m,i}/P^o_{m,j} \ (i \neq j) \quad \text{(Equation 2)}$$

$$\alpha_{i/j} = \frac{y_i/y_j}{x_i/x_j} \quad \text{(Equation 3)}$$

where $P_{m,i}$ is the permeance for gas i; Q is the moles of gas i permeated through the membrane area ($A_m$) over a time period of t; $\Delta P_i$ is the partial pressure difference of gas i between feed and permeate sides; ideal selectivity for gas i over $$j(\alpha^o_{i/j})$$

is from the ratio of pure gas permeances $$(P^o_{m,i}/P^o_{m,j});$$

separation factor ($\alpha_{i/j}$) is from molar fraction ratios in permeate ($y_i/y_j$) and feed ($x_i/x_j$).

The influence of $CO_2$ composition in the feed on membrane separation performance was investigated with M2 membrane, followed by 2-week permeation measurements with equimolar $CO_2/C_2H_2$ feed. The membrane was then regenerated under flowing ozone/oxygen (~4 wt. % ozone estimated by vendor specification, DONSU 3G/H Ozone Generator) at 423 K for 24 h. The epoxy also degraded during the treatment and epoxy was applied again to seal the hollow fiber membrane in the membrane module.

Temperature Influence on Unary Gas Permeation

Temperature influence on unary gas permeation of $CO_2$ and $C_2H_2$ was investigated in 295-373 K range with M6 hollow fiber membrane. Permeance for the same membrane generally follows the Arrhenius-van't Hoff relationships with temperature. Membrane permeation activation energy analysis was conducted with the following equation:

$$P_{m,i} = P^*_{m,i} e^{\frac{-E_{P,i}}{RT}} \quad \text{(Equation 4)}$$

where $$P^*_{m,i}$$

is the exponential prefactor, $E_{P,i}$ is the permeation activation energy for gas i, and R is the gas constant. The permeation activation energy for $CO_2$ and $C_2H_2$ was determined as −9.3 and −5.8 kJ/mol, respectively. It is worth noting that there was about a quarter loss of room temperature membrane permeance after temperature influence tests. The accuracy of permeation activation energy data from this study was comprised by the permeance decrease over the measurements.

BET, Adsorption Isotherm and Dynamic Uptake Measurements and Analysis

The residual crystals from membrane synthesis and the large in situ synthesized zeolite crystals were thoroughly tested for BET surface area, adsorption isotherm and/or dynamic uptake. Before adsorption measurements, the samples were degassed at 573 K under vacuum. $N_2$ adsorption at 77 K was conducted with a Micromeritics ASAP 2010 unit. Adsorption isotherms were collected with a Cahn 1000 microbalance. Buoyancy correction was done by assuming ideal-gas for gas density calculation. For dynamic adsorption tests, different pressure steps (about 10, 30, 100 Torr, 1 Torr=133.3 Pa) were tried and two pressure steps each for $CO_2$ and $C_2H_2$ were arbitrary chosen considering both heat effect and test noise. The final equilibrium pressure was kept about 500-600 Torr. The weight change was monitored with an Omega Engineering OMB-DAQ-2408 data acquisition module. The equilibrium typically took 15 min to 1 hour.

The dynamic uptake results were used to compare transport diffusivity of $CO_2$ and $C_2H_2$ in the CHA crystals following the work of Ruthven and coworkers. The non-isothermal adsorption equations used are:

$$\frac{m_t}{m_\infty} = 1 - \frac{\beta}{1+\beta}\exp\left[\frac{-haD_i t}{\rho C_p(1+\beta)r^2}\right] \quad \text{(Equation 5)}$$

$$\beta \equiv \left(\frac{\Delta H}{C_p}\right)\left(\frac{\partial c^o}{\partial T}\right)_p \quad \text{(Equation 6)}$$

where $m_t$ is the newly adsorbed amount at time t since previous equilibrium; $m_\infty$ is the additional adsorbed amount after new equilibrium; h is the external heat transfer coefficient; a is the external surface area per unit volume of adsorbent sample; $D_i$ is the intracrystalline transport diffusivity for component i; ρ is the density of CHA zeolite; $C_p$ is the heat capacity of CHA zeolite; r is the equivalent radius of zeolite crystal; −ΔH is heat of adsorption; $c^o$ is the equilibrium adsorbed phase concentration.

$$\frac{-ha}{\rho C_p r^2}$$

was taken as a constant k' and uptake data between 50-200 s was used for fitting to get $D_{CO2}/D_{C2H2}$ value.

$CO_2/C_2H_2$ Separation with CHA Zeolite Membrane Synthesized by Secondary Growth To verify whether the $CO_2/C_2H_2$ separation is limited to the membrane prepared under specific synthetic conditions, a CHA zeolite disk membrane was prepared following Yang et al. (*ChemNanoMat* 2019, 5, 61-67) which is incorporated by reference herein in its entirety. The membrane was fabricated with a more dilute precursor with conventional secondary growth method. The same type of seed crystals described above. The membrane synthesis precursor has molar ratio of 1.0 $SiO_2$:0.10 $Na_2O$:0.025 $Al_2O_3$:0.40 TMAdaOH: 44$H_2O$. Hydrothermal synthesis was conducted at 453 K for 24 h. After synthesis, the membrane was washed and soaked in DI water till pH was close to neutral. Conventional heating resulted in non-selective membranes. After drying, ozone activation was conducted by putting the membrane under flowing ozone/oxygen for 4 days. The membrane was tested for $CO_2$, $C_2H_2$, and $C_3H_8$ unary permeance at room temperature. For a membrane with $CO_2/C_3H_8$ unary selectivity of 37, $CO_2/C_2H_2$ unary selectivity of 20 was observed. The result demonstrates feasibility of different synthesis approaches.

Following on solution-diffusion model (Permeability=Solubility×Diffusivity) commonly used for membrane permeation analysis, equilibrium adsorption isotherms and dynamic adsorption uptake data on $CO_2$ and $C_2H_2$ were obtained to help elucidate the reasons for high permselectivity. The zeolite crystals collected from the membrane synthesis were relatively small in size (about 1 μm) and hence unsuited for dynamic uptake measurements. Larger-size high-silica CHA zeolite was synthesized with average crystal size of ~15 μm and a wide size distribution. The CHA zeolite demonstrated slight $C_2H_2$ adsorption selectivity in the measured pressure range. The same trend was also observed in zeolite crystal residues collected from membrane synthesis. The dynamic uptake measurements were conducted by filling the gas chamber of the Cahn microbalance in the range of 400-600 Torr (1 Torr=133.3 Pa) and let it equilibrate, then 10-100 Torr step change in pressure was implemented to measure uptake rates. The pressure change step size was chosen considering heat effects and noise in data. The section between 50-200 s was used with a non-isothermal model to get the diffusivity ratio between $CO_2/C_2H_2$. It was found that $D_{CO2}/D_{C2H2}$ was about 0.8, i.e. slight $C_2H_2$ diffusion selectivity. With the solution-diffusion model, the CHA membrane would therefore be predicted to be slightly $C_2H_2$-selective in both adsorption and diffusion aspects, which is completely contrary to the experimental findings.

Additional results are discussed in Anjikar et al., "Unexpected high $CO_2$ over $C_2H_2$ separation performance by high-silica CHA zeolite membranes" (Journal of Membrane Science, Volume 683, 2023, 121853, ISSN 0376-7388, https://doi.org/10.1016/j.memsci.2023.121853) which is incorporated by reference herein and a copy of which is provided in an appendix.

In summary, the highly selective $CO_2/C_2H_2$ separation behavior with high-silica CHA zeolite membranes was surprisingly and unexpectedly found. Mixture permeation tests confirmed practical applicability of the membranes for $CO_2/C_2H_2$ binary mixtures. The membrane permeance and $CO_2/C_2H_2$ separation factor decreased somewhat over 15 days of on-stream measurements, but importantly the membrane separation performance could be fully recovered through $O_3$ treatment at 423 K. Equilibrium adsorption isotherm and dynamic uptake data indicate that the intrinsic CHA zeolite selectivity for this gas pair should be close to unity and also in the opposite direction (i.e. $C_2H_2$ over $CO_2$). Hence, it is believed that the permeation selectivity originates from the complex morphology of the membrane, in particular the existence of intercrystalline boundaries of yet-unknown structure. The gas permeation phenomena described herein challenges the general understanding of the influence of intercrystalline boundaries on gas permeation in crystalline nanoporous membranes. The high permselectivity for $CO_2$ over $C_2H_2$ is unexpected considering their close kinetic size and dimensions, and has not been reported with any other membrane.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A process for separating carbon dioxide from acetylene comprising:

feeding a feed composition comprising carbon dioxide ($CO_2$) and acetylene ($C_2H_2$) to a first separator comprising a CHA-type zeolite membrane, wherein the first separator separates the feed composition into a carbon dioxide-rich stream and an acetylene-rich stream.

2. The process of claim 1, further comprising:

purifying the acetylene-rich stream to form a product stream.

3. The process of claim 1, wherein the CHA-type zeolite membrane has a $CO_2/C_2H_2$ permselectivity of at least 10.

4. The process of claim 1, wherein the CHA-type zeolite membrane has a $CO_2/C_2H_2$ permselectivity of at least 37.

5. The process of claim 1, wherein the CHA-type zeolite membrane has a $CO_2/C_2H_2$ permselectivity of –37 to 88.

6. The process of claim 1, wherein the CHA-type zeolite membrane has a $CO_2/C_2H_2$ permselectivity of 40 to 70.

7. The process of claim 1, further comprising:

treating the CHA-type zeolite membrane with ozone to regenerate the membrane.

8. The process of claim 1, wherein the CHA-type zeolite membrane is a high-silica CHA-type zeolite membrane.

9. The process of claim 1, wherein the CHA-type zeolite membrane comprises a porous substrate and a CHA-type zeolite coating.

10. The process of claim 9, wherein the CHA-type zeolite coating is formed by a process comprising:

coating at least a portion of the porous substrate with a precursor gel.

11. The process of claim 10, wherein the precursor gel comprises:

water;

silicon dioxide;

sodium oxide;

aluminum oxide; and trimethyladamantylammonium hydroxide.

12. The process of claim 1, wherein the feed composition comprises partially oxidized natural gas.

13. The process of claim 1, wherein the separation is performed at a temperature in a range of from 20° C. to 150° C.

14. The process of claim 1, wherein the CHA-type zeolite membrane has a thickness of less than 1 μm.

15. The process of claim 1, wherein the CHA-type zeolite membrane has a thickness in a range of from about 500 nm to about 10 μm.

16. The process of claim 9, wherein the porous substrate comprises an organic material.

17. The process of claim 9, wherein the porous substrate comprises a polymeric material selected from the group consisting of polypropylene, polyethylene, polytetrafluoroethylene, polysulfone, polyimide, and polyamide-imide (PAI) hollow fiber supports.

18. The process of claim 9, wherein the porous substrate comprises an inorganic material.

19. The process of claim 18, wherein the inorganic material is selected from the group consisting of a ceramic sintered body and a sintered metal.

20. The process of claim 9, wherein the porous substrate has a porosity in a range of about 10% to about 60%.

* * * * *